United States Patent
Lilliestielke et al.

(10) Patent No.: US 7,441,392 B2
(45) Date of Patent: Oct. 28, 2008

(54) CUTTING HEIGHT ADJUSTMENT FOR LAWN MOWER

(75) Inventors: Fredrik Lilliestielke, Jönköping (SE); Peter Mejegård, Jönköping (SE); Mats Axelsson, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 102 days.

(21) Appl. No.: 11/512,946

(22) Filed: Aug. 30, 2006

(65) Prior Publication Data

US 2007/0051082 A1    Mar. 8, 2007

(30) Foreign Application Priority Data

Sep. 2, 2005    (SE) .................................. 0501954

(51) Int. Cl.
*A01D 34/00* (2006.01)

(52) U.S. Cl. ........................................ 56/15.9; 56/15.2

(58) Field of Classification Search ................. 56/14.7, 56/14.9–15.2, 17.1, 17.2, 320.1
See application file for complete search history.

(56) References Cited

U.S. PATENT DOCUMENTS

| | | | | |
|---|---|---|---|---|
| 3,550,364 A | * | 12/1970 | Musgrave | 56/15.8 |
| 4,120,136 A | * | 10/1978 | Rose | 56/17.1 |
| 4,310,997 A | * | 1/1982 | Streicher | 56/15.9 |
| 4,320,616 A | * | 3/1982 | Marto | 56/15.3 |
| 4,760,686 A | * | 8/1988 | Samejima et al. | 56/15.8 |
| 4,840,020 A | * | 6/1989 | Oka | 56/15.2 |
| 5,251,429 A | * | 10/1993 | Minato et al. | 56/17.2 |
| 5,816,035 A | | 10/1998 | Schick | |
| 6,038,841 A | * | 3/2000 | Bates et al. | 56/15.8 |
| 6,481,194 B1 | * | 11/2002 | Brewer et al. | 56/17.2 |
| 6,530,200 B1 | * | 3/2003 | Minoura et al. | 56/17.1 |
| 6,854,250 B2 | * | 2/2005 | Boyko | 56/14.9 |
| 6,857,254 B2 | * | 2/2005 | Melone et al. | 56/15.8 |
| 2004/0221561 A1 | | 11/2004 | Koehn | |

FOREIGN PATENT DOCUMENTS

| | | |
|---|---|---|
| DE | 332262 | 1/1921 |
| FR | 2469867 | 5/1981 |

* cited by examiner

*Primary Examiner*—Thomas B Will
*Assistant Examiner*—Mai T Nguyen
(74) *Attorney, Agent, or Firm*—Pearne & Gordon LLP

(57) ABSTRACT

The present invention relates to a lawn mower (1), comprising a front mounted mower deck (5) comprising at least one cutting knife, wherein the cutting knife is rotatably arranged in a substantially horizontal plane (10), a wheel suspension arrangement (19) connected to the mower deck (5) and comprising at least one wheel (17) to be in contact with the ground so as to support the mower deck (5) during mowing, wherein the wheel (17) is connected to the wheel suspension arrangement (19) by means of an axle (21) to be in perpendicular alignment with the ground during mowing, and a cutting height adjustment (27) device adapted to move the wheel suspension arrangement (19) with respect to the mower deck (5) for adjusting the mutual height relationship between the wheel (17) and the mower deck (5), so as to adjust the distance between the plane of the cutting knife and the ground. The lawn mower is characterized in that the axle (21) is pivotal about an axis (35) with respect to the wheel suspension arrangement (19) and connected to the cutting height adjustment device (27) in such a way that the axle (21) is parallelly displaced when the wheel suspension arrangement (19) is moved.

7 Claims, 11 Drawing Sheets

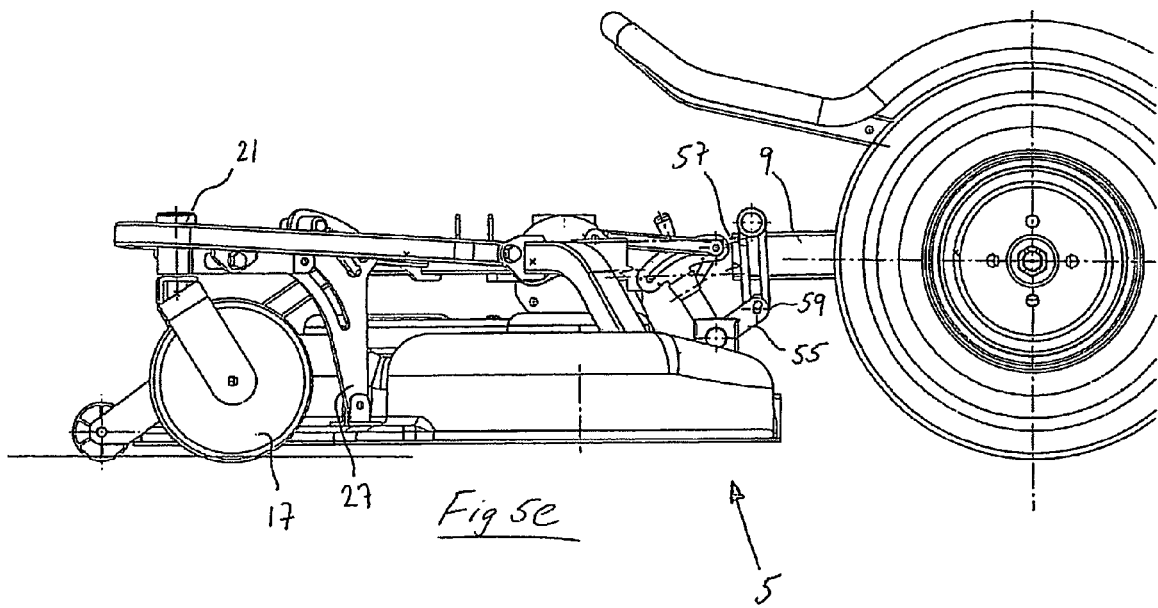

CUTTING HEIGHT ADJUSTMENT FOR LAWN MOWER

FIELD OF THE INVENTION

The present invention relates to a lawn mower according to the preamble of claim 1.

BACKGROUND OF THE INVENTION

Some lawn mowers comprise a front mounted mower deck which is connected to the chassis of the lawn mower by means of support arms. The mower deck is the part of the lawn mower which is provided with one or several cutting knifes. The cutting height, i.e. the distance between the plane in which the cutting knifes are rotatably positioned and the ground often need to be variable. This is accomplished by means of some form of cutting height adjustment device.

Wheels are normally provided in front of the mower deck and sometimes also behind the mower deck. The wheels are intended to be in contact with the ground during mowing and support the mower deck as well as maintain a constant distance between the mower deck, i.e. the plane of the cutting knifes and the ground. A mower deck with no front mounted wheels may encounter problems when reaching an up-hill slope, since the front edge of the mower deck may get stuck in the ground and prevent forward motion of the lawn mower.

Moreover, such a wheel is often pivotal about an axis and the centre of the wheel is eccentrically displaced from the axis, so called pivot wheels. The pivot wheels make it easier for the lawn mower to pass around obstacles such as tufts, cf. the wheels of shopping trolleys.

The cutting height adjustment device needs to be coupled to the mower deck and to the wheels so as to adjust the mutual height relationship between the mower deck, i.e. the plane of the cutting knifes, and the centre of the wheels, i.e. the ground. If pivot wheels are employed, the axes which they can pivot about must be kept perpendicular to the ground at all time during mowing. If not, the pivot wheels would assume a preferred position with respect to their axes and their function would be deteriorated.

Several technical solutions have been focused on this problem of adjusting this mutual height relationship at the same time as the pivot axes of the pivot wheels are kept perpendicular to the ground.

RELATED ART

One related art solution comprises a frame which surrounds the front and the sides of the mower deck. Pivot wheels, each having a pivot axis to be perpendicular to the ground, are mounted to the frame in front of the mower deck. A cutting height adjustment device is coupled to the frame and to the mower deck and can parallelly displace the mower deck with respect to the frame. Hereby, the mutual height relationship between the mower deck and the frame can be varied and thus the cutting height can be adjusted. By means of this cutting height adjustment device, the pivot axes are maintained in a perpendicular alignment with the ground. The frame serves to connect the cutting height adjustment device with the pivot wheels. However, since the frame surrounds the mower deck close-up cutting, e.g. cutting along a wall, is deteriorated. The reason is that the frame functions as a distance and prevent the cutting knifes from reaching right up to the wall. Another disadvantage is that the cutting height adjustment device is complicated and comprises many mechanical parts.

Another related art solution comprises a mower deck being provided with four wheel suspension arrangements, one for each pivot wheel. Each wheel suspension arrangement comprises a bracket which is fastened to the mower deck, a vertically elongated pivot wheel axle and a pivot wheel. The pivot wheel is attached to the pivot wheel axle and adapted to be in contact with the ground for supporting the mower deck. The bracket is provided with a vertically extended sleeve in which the pivot wheel axle can run. The sleeve is in turn provided with a horizontal through hole and the pivot wheel axle is provided with vertically separated, horizontal through holes. When the through hole of the sleeve is aligned with one of the through holes of the wheel axle, a pin can be inserted and thus lock the pivot wheel axle to the bracket. By choosing different through holes of the pivot wheel axle to be aligned with the through hole of the sleeve, the mutual height relationship between the pivot wheel and the plane, in which the cutting knifes are rotatably positioned, can be varied. Thus, the cutting height of the mower deck can be altered. Since the pivot wheel axle is provided with a plurality of vertically separated through holes, so that the mower deck can be adapted for different cutting heights, e.g. within an interval of 25-125 mm, the pivot wheel axle becomes linearly displaceable in the vertical direction. However, the pivot wheel axle will protrude vertically from the sleeve when the lowermost through hole of the pivot wheel axle is chosen. This will have a negative influence on the close-up cutting ability of the lawn mower, since it may be difficult for the mower deck to mow, e.g. under a tree having branches which are close to the ground.

OBJECT OF THE INVENTION

An object of the present invention is to provide a lawn mower with improved close-up cutting ability.

SUMMARY OF THE INVENTION

These and other objects of the present invention are accomplished by means of a lawn mower as initially defined and with features according to the characterising portion of claim 1.

According to the invention the axle is pivotal about an axis with respect to the wheel suspension arrangement and connected to the cutting height adjustment device in such a way that the axle is parallelly displaced when the wheel suspension arrangement is moved. Hereby, the height of the wheel suspension device with respect to the ground is not affected, when the mutual height relationship between the wheel and the mower deck is adjusted. Thus, close-up cutting, e.g. mowing under a tree having branches which are close to the ground, is not affected as a function of the chosen cutting height.

Preferably the axis is horizontal. Hereby, a convenient way of moving the axle is achieved.

Advantageously, the cutting height adjustment device comprises an adjustment disk which is connected to the mower deck and which is provided with a first curved slot, wherein the axle comprises a track rod having a first pin which is slidable along the first slot for pivoting the axle about the horizontal axis, when the suspension arrangement is moved with respect to the mower deck so as to parallelly displace the axle. Hereby, a simpler and less space requiring mechanical design is obtained in comparison with related art solutions, which require complicated constructions to accomplish the mutual height relationship adjustments.

Preferably, the adjustment disk is provided with a second curved slot, and the wheel suspension arrangement comprises a second pin which is slidable along the second slot when the wheel suspension arrangement is moved with respect to the mower deck, and which second pin is adapted to lock the adjustment disk with respect to the wheel suspension arrangement at positions along the second slot. Hereby, the wheel suspension device can easily be adjusted and become locked in different positions corresponding to different cutting heights of the mower deck.

Suitably, the lawn mower comprises at least two of said wheel suspension arrangements and at least two of said cutting height adjustment devices, wherein the cutting height adjustment devices are adapted to move a respective wheel suspension arrangement independently of each other with respect to the mower deck. Hereby close-up cutting is improved, since the wheel suspension arrangements do not need to be interconnected, which is the case in the related art solution where a frame is required for connecting the wheel suspension arrangements.

Preferably, the lawn mower comprises at least one support arm connecting the mower deck with a chassis of the lawn mower, wherein the support arm can lift the mower deck to a position in which the mower deck is pivotally suspended by the support arm along a horizontal pivot axis, wherein the mower deck has its centre of gravity located in front of the pivot axis, with respect to the forward direction of the lawn mower, and wherein the mower deck comprises a mower deck suspension arrangement for suspending a rear edge of the mower deck to the support arm, at a point which is located behind the pivot axis with respect to the forward direction of the lawn mower. Hereby, the mower deck suspension arrangement is not loaded by the weight of the mower deck.

BRIEF DESCRIPTION OF THE DRAWINGS

The present invention will now be described with reference to accompanying drawings, on which:

FIG. 5a-e show a cutting height adjusting sequence for the mower deck.

DETAILED DESCRIPTION OF A PREFERRED EMBODIMENT

Figure 1:
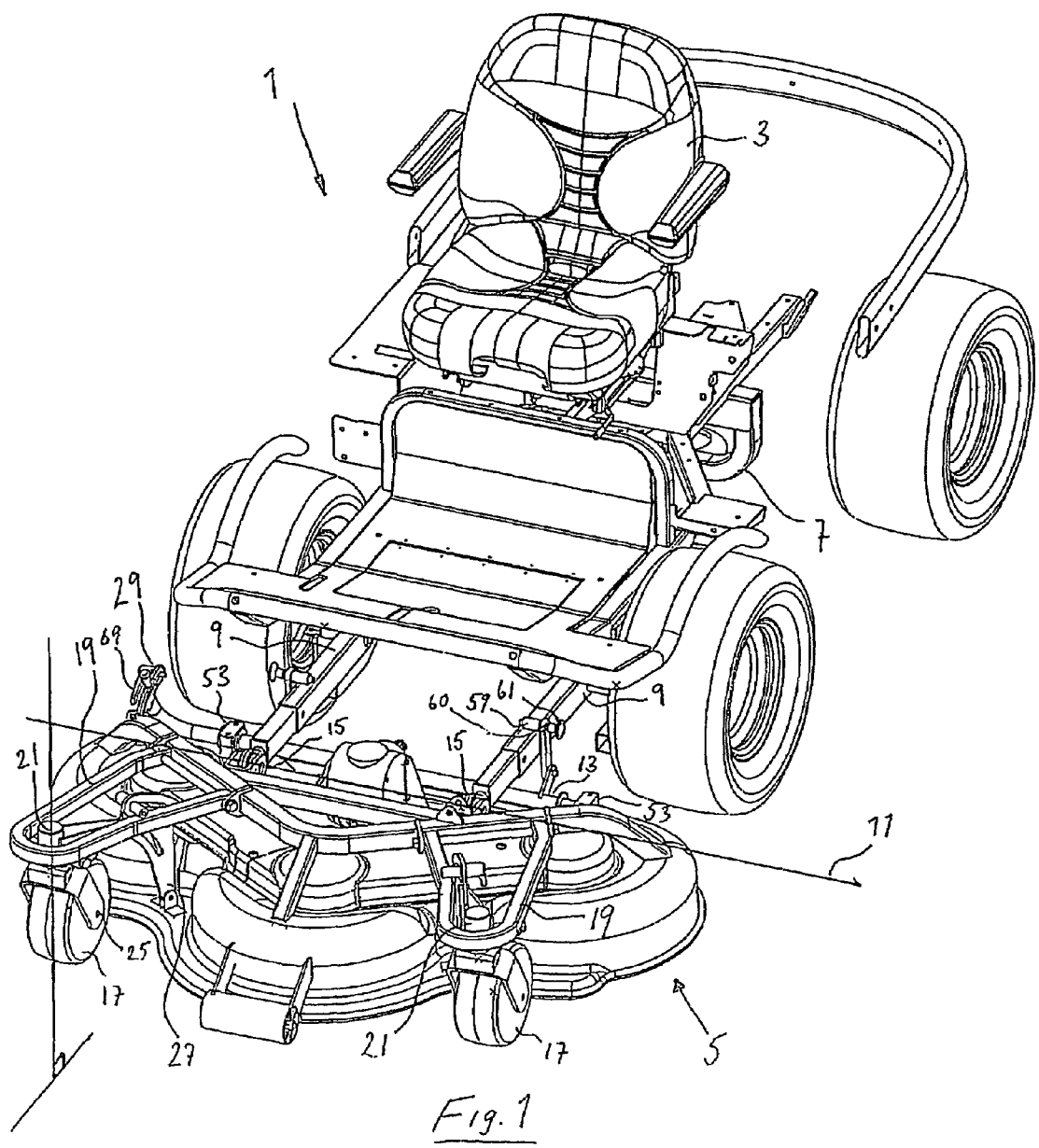
FIG. 1 shows a perspective view of a lawn mower with a front mounted mower deck according to the present invention.

FIG. 1 shows a lawn mower 1 according to the present invention. The lawn mower comprises a seat 3 for an operator to sit on when manoeuvring the lawnmower 1.

Steering wheel, brake pedal, throttle pedal as well as other handles, knobs and/or pedals suitable for the operation of the lawn mower have been omitted for the sake of clarity. The lawn mower 1 further comprises a front mounted mower deck 5 which is connected to the chassis 7 of the lawn mower by means of first and second support arms 9.

Figure 4A:
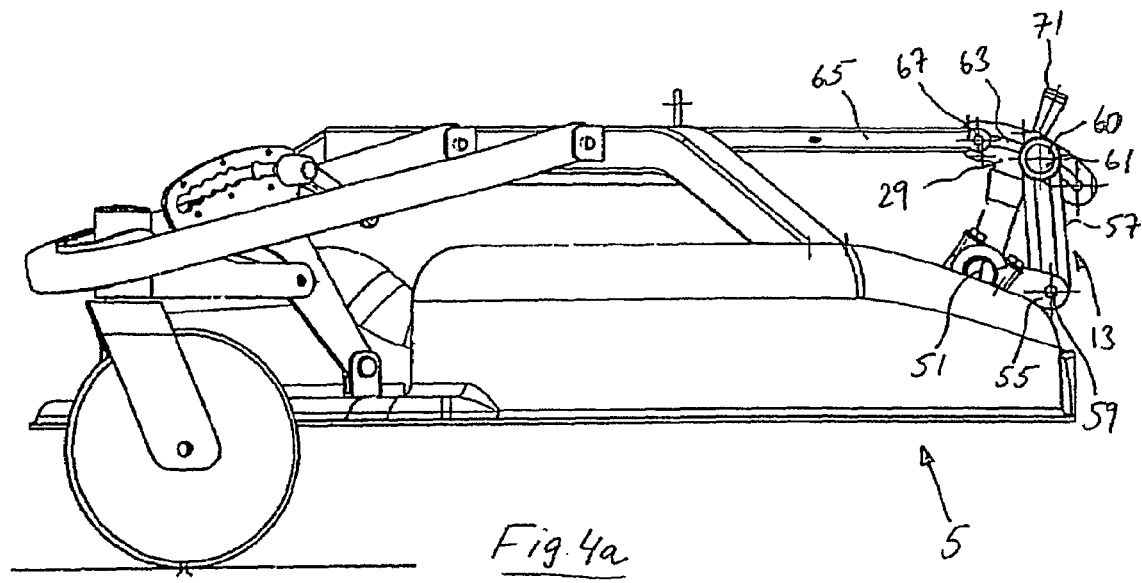
FIG. 4a-b show a rear cutting height adjustment device set in two different positions, respectively.
Figure 4B:
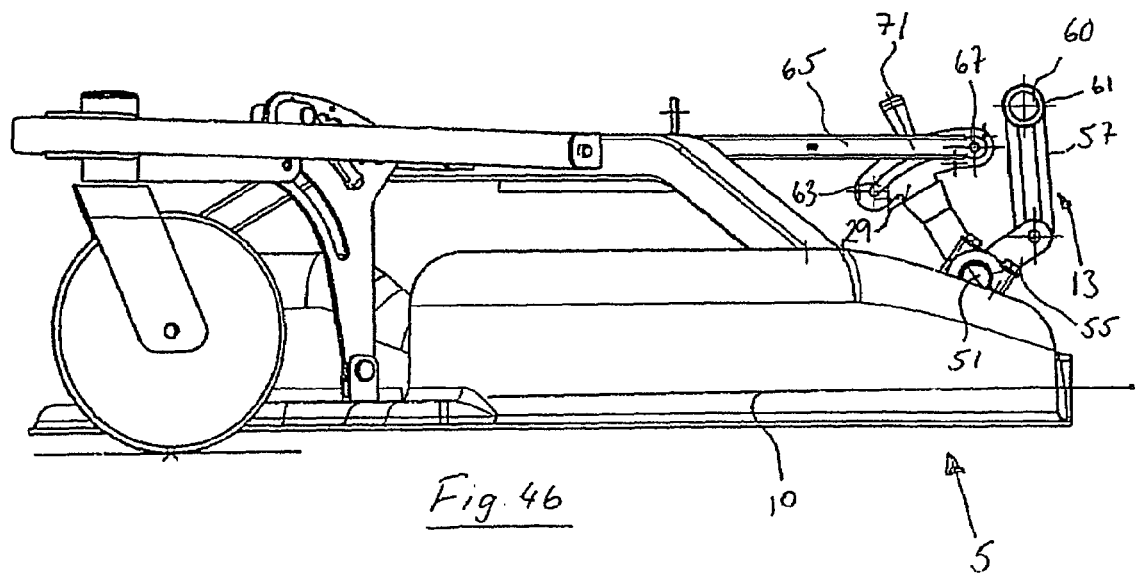

The mower deck 5 comprises not shown cutting knifes which are rotatably arranged in a substantially horizontal plane 10 on the underside of the mower deck 5 (see FIG. 4b). In this case, three separate cutting knifes are provided side by side, i.e. a left, a right and a centre cutting knife, which are hidden below a respective cover. The phrase "substantially horizontal" is intended to mean a plane with an angle of incidence to the horizontal plane, which means that the plane 10 of the cutting knifes (see FIG. 4b where it is schematically shown) is not completely parallel with the ground during mowing, but is inclined downwardly (as seen in the forward direction of the lawn mower). This is to facilitate mowing. The angle of incidence is normally within an interval of 0-5° with respect to the horizontal plane.

The support arms 9 are vertically movable by means of a not shown hydraulic cylinder. This means that the mower deck 5 can be lifted from a lower position, in which mowing can be performed to an upper transport position. In this upper position the cutting height of the mower deck 5, i.e. the distance between the plane 10 of the cutting knifes and the ground, can also be adjusted by means of a cutting height adjustment device, which will be more thoroughly described below.

The mower deck 5 is moreover tiltably connected to the support arms 9 by means of joints 15, which are provided at the distal ends of the support arms 9. A horizontal tilt or pivot axis 11 thus extends between the joints 15, i.e. perpendicularly to the longitudinal direction of the support arms 9.

A mower deck suspension arrangement 13 is arranged at the rear edge of the mower deck 5 so that the mower deck can be suspended by and locked to the support arms 9. The suspension arrangement 13 will also be more thoroughly described below.

In front of the mower deck 5, two so called pivot wheels 17 are arranged. The pivot wheels 17 need to be in contact with the ground during mowing for supporting the mower deck 5 and maintaining a constant distance between the mower deck 5, i.e. the plane 10 of the cutting knifes and the ground. The pivot wheels 17 thus prevent the mower deck 5 from getting stuck in the ground, e.g. in case the lawn mower 1 reaches an uphill slope. The pivot wheels 17 are connected to the mower deck 5 by means of a first and a second wheel suspension arrangement 19, which are separated in a lateral direction and functions independently of each other. Each pivot wheel 17 is attached to one of the wheel suspension arrangements 19 by means of an axle 21, which needs to be perpendicular to the ground during mowing and substantially perpendicular to the plane of the cutting knifes. Each pivot wheel is also pivotal about a longitudinal axis 21 of the axle 21 and the pivot wheel centre 25 is eccentrically displaced from the longitudinal axis 21 in a lateral direction. The eccentricity makes it easier for the lawn mower 1 to pass around obstacles such as tufts, cf. the wheels of shopping trolleys.

A cutting height adjustment device 27 is also coupled between the mower deck 5 and each wheel suspension arrangement 19, so that the mutual height relationship between the mower deck 5, i.e. the plane of the cutting knifes, and the centre of the wheels 25, i.e. the ground can be adjusted. To this end, a front and a rear cutting height adjustment device 27, 29 are provided, which will be further described below.

Figure 2:
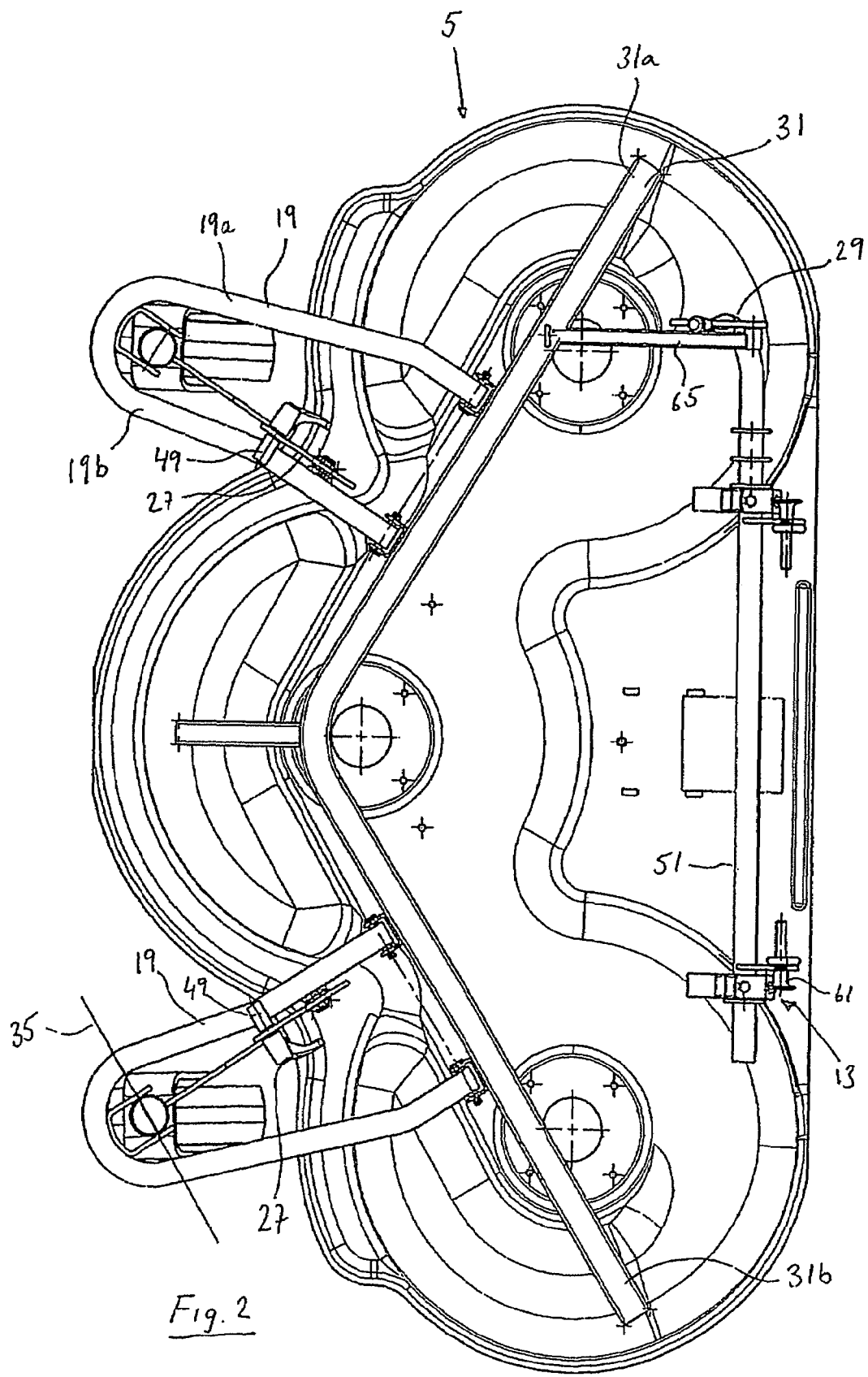
FIG. 2 shows a top plan view of the mower deck in FIG. 1.

FIG. 2 shows a top plan view of the mower deck 5. The mower deck 5 comprises a V-shaped beam 31, which is rigidly attached to the upper side of the mower deck 5 and which extends in the lateral direction from one side of the mower deck to the other. The support arms 9 and their connections to the mower deck 5 have been omitted for the sake of clarity, but the distal ends of the support arms 9 are attached to this beam 31 too. The wheel suspension arrangements 19 are also connected to the beam 31.

Each wheel suspension arrangement 19 is comprised from a bent, substantially U-shaped tube having two legs 19a, 19b, wherein each leg is pivotally connected to the beam 31 by means of joints. The first wheel suspension arrangement 19 is connected to a first shank 31a of the beam, while the second wheel suspension arrangement 19 is connected to a second shank 31b of the beam. The first and the second wheel suspension arrangement 19 are separated from each other in the lateral direction of the mower deck 5 and positioned on a respective side of the centre cutting knife cover. This cover projects forwardly between the wheel suspension arrangements 19 and becomes substantially flush with an imaginary line drawn between the outermost ends of the first and the second wheel suspension arrangements 19. Accordingly, the centre cutting knife, which is situated under the centre cover, will have a good coverage during mowing.

A first and a second front cutting height adjustment device 27 are connected between the front edge of the mower deck 5 and the first and the second wheel suspension arrangements 27, respectively. The third rear cutting height adjustment device 29 is connected at the rear edge of the mower deck 5 and will be more elucidated below. The first, second and third cutting height adjustment devices together act to uniformly adjust the cutting height of the mower deck 5, i.e. the distance between the plane 10 of the cutting knifes and the ground.

Figure 3A:
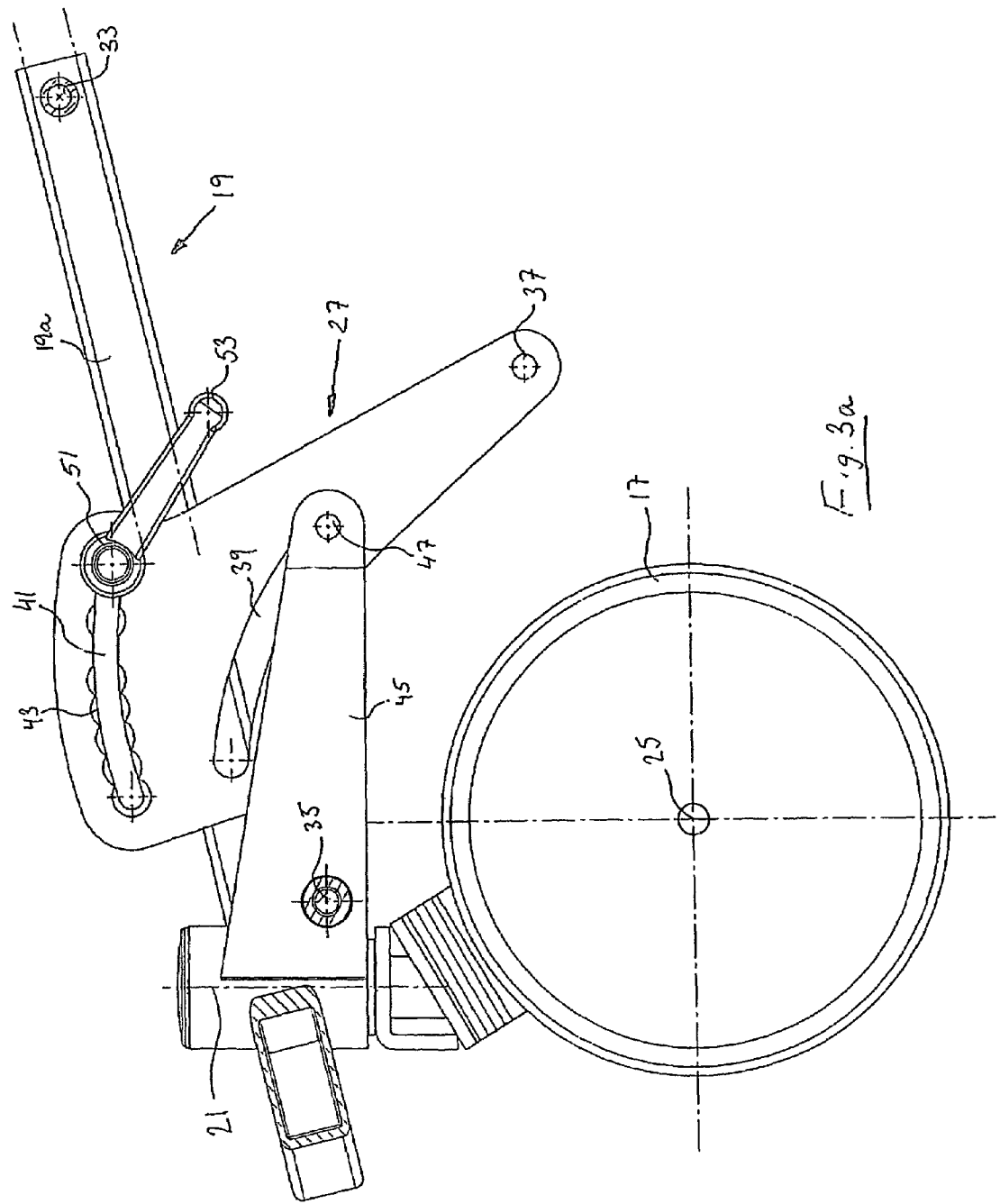
FIG. 3a-b show a pivot wheel suspension arrangement and a front cutting height adjustment device set in two different positions, respectively.
Figure 3B:
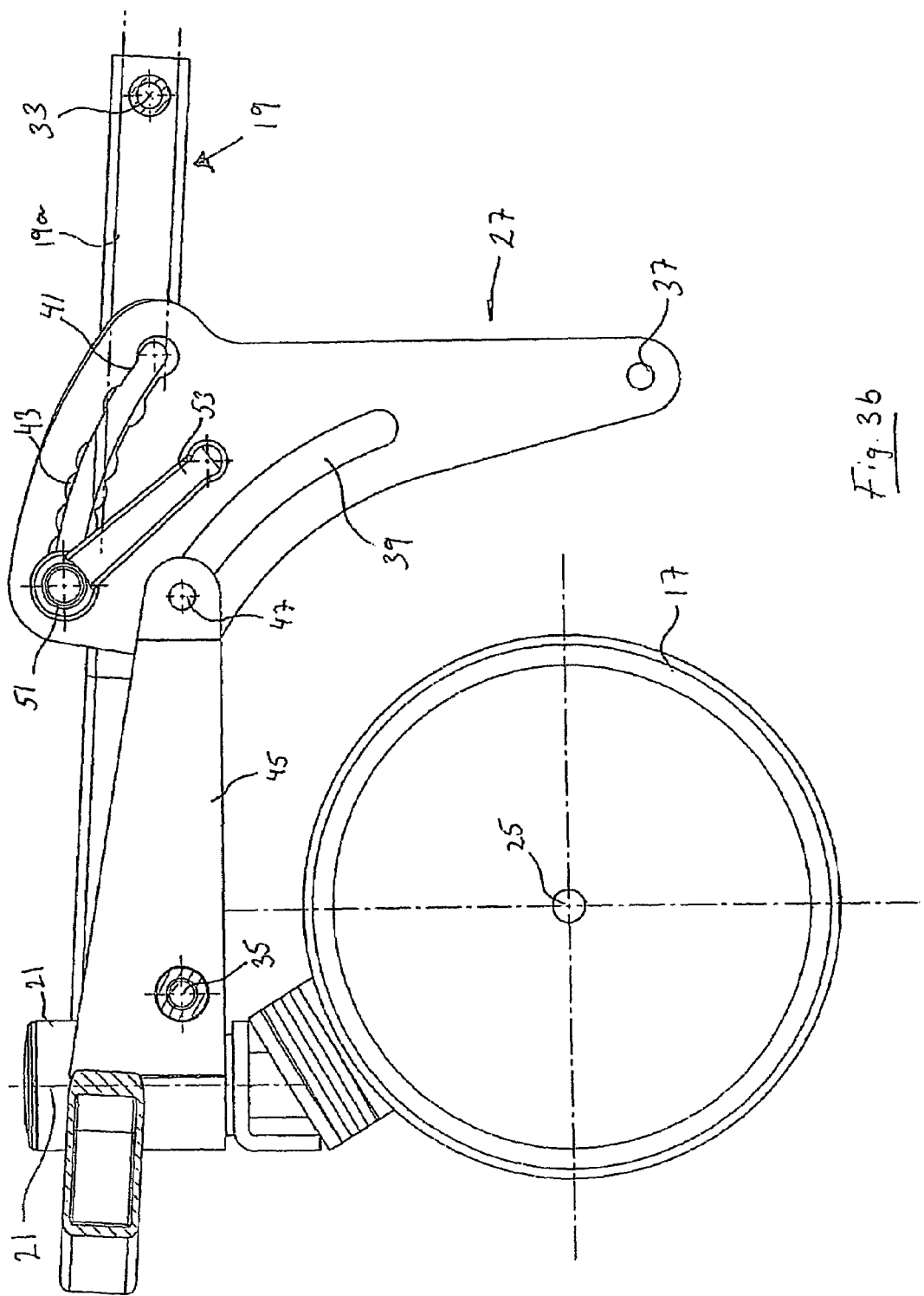

FIG. 3a-b show side views of the wheel suspension arrangement 19 when set in two different positions, by means of the cutting height adjustment device 27, and which correspond to two different cutting heights of the mower deck 5. Only one of the wheel suspension arrangements 19 is described below, but the same principles apply to the other. As mentioned before, the wheel suspension arrangement 19 comprises a bent U-shaped tube which is provided with two legs 19a, 19b. The legs are connected to the V-shaped beam at an attachment point 33 about which the legs 19a, 19b and thus the whole wheel suspension arrangement 19 can pivot. The other end of the wheel suspension arrangement, i.e. the distal end is provided with the afore-mentioned wheel axle 21, which can pivot with respect to the wheel suspension arrangement 19 about a horizontal axis 35 (see also FIG. 2). The pivot wheel 17 is both rotatable about its centre 25 and pivotally connected to the axle 21, which means that the pivot wheel 17 can pivot about the longitudinal axis of the axle 21, henceforth referred to as pivot axis 21. The centre of the pivot wheel 25 is displaced from the longitudinal axis 21 in a lateral direction so that the pivot wheel 17 becomes eccentrically displaced. Due to this eccentricity the pivot wheel 17 can more easily round an obstacle on the lawn, e.g. a tuft. Due to this eccentricity the axle 21 also has to remain perpendicular to the ground during mowing, i.e. substantially perpendicular to the plane 10 of the cutting knifes, so that the pivot wheel 17 freely can pivot about the pivot axis 21 without any problem.

A front cutting height adjustment device 27, in the form of an adjustment disk 27, is by means of one end 37 pivotally connected to the front edge of the mower deck 5. The adjustment disk 27 moreover comprises a lower curved slot 39 and an upper curved slot 41, the latter being provided with circular recesses 43 separated along the slot 41. A track rod 45 is at one end firmly attached to the wheel axle 21 and with another end connected to the lower curved slot of the adjustment disk by means of a pin 47, so that the pin 47 can slide along the lower slot 39. One of the legs 19a of the wheel suspension arrangement 19 is provided with a bracket 49 (see FIG. 2) having a pin 51, which by means of a threaded end is in engagement with the bracket 49. The pin 51 extends through the upper slot 41 and is so arranged that the pin 51 can slide along the upper slot 41. A handle 53 is attached to the other end of the pin 51, so that the pin by means of the threads and the handle 53 frictionally can grip about the adjustment disk 27 and lock it in a predetermined position along the upper slot 41. The predetermined position is determined by the circular recesses 43, which each correspond to a particular cutting height of the mower deck 5.

In FIG. 3a the pivot wheel 17 is set in a lower position with respect to the mower deck 5, while in FIG. 3b the pivot wheel is set in an upper position with respect to the mower deck. When comparing these figures, the pin 47 of the track rod 45 and the pin 51 with the handle 53 have been slid from a right end position to a left end position, where each end position corresponds to the lower or the upper position of the pivot wheels 17 with respect to the mower deck 5, i.e. maximum or minimum cutting heights. It is of course also possible to choose other positions than the end positions, which thus corresponds to cutting heights between the maximum and minimum cutting heights.

Figure 3C:
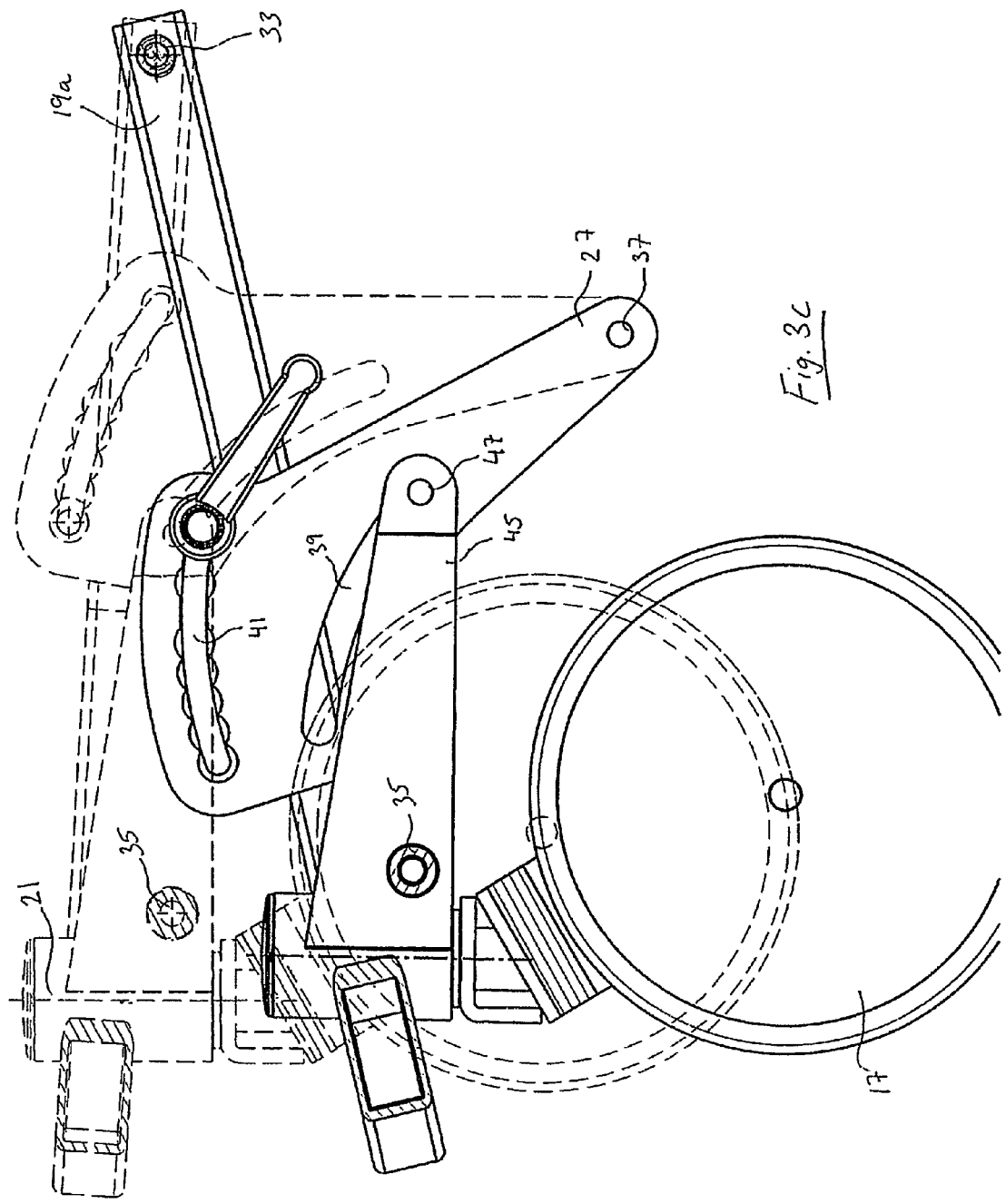
FIG. 3c shows FIG. 3a-b overlapped.

FIG. 3c is an overlap of FIG. 3a and FIG. 3b and is intended to depict what happens when the pivot wheel 17 is adjusted from the lower position to the upper position, i.e. when the cutting height is adjusted. In this figure, the position of the connection 33 of the legs 19a to the V-shaped beam 31 remains the same when lifting the pivot wheel 17. Also, the position of the connection 37 of the adjustment disk 27 to the front edge of the mower deck 5 remains the same when lifting the pivot wheel 17. If the axle 21 not was pivotal about the horizontal axis 35, the axle would become inclined to the vertical axis (as seen in FIG. 3c). Hereby, the perpendicular alignment between the axle 21 and the ground would disappear. But since the axle 21 is pivotal about the horizontal axis 35 and since the track rod 45 is slidably connected to the lower slot 39 of the adjustment disk 27 by means of the pin 47, the axle 21 will be forced to pivot about the horizontal axis 35 (in the anti-clockwise direction as seen in FIG. 3c) and thus become parallelly displaced and thus remain perpendicular to the ground, even though the pivot wheel 17 has been lifted from the lower position to the upper position. This compensation of the axle angularity is critical, since the functionality of the pivot wheels 17 would be very much deteriorated, i.e. the ability to round tufts, if the axle 21 could adopt other angles than a perpendicular alignment with the ground. To accomplish this, the shape of the lower and the upper slot 39, 41 are so designed that they only allow this particular motion of the axle 21, i.e. the parallel displacement, when the pivot wheel 17 is lifted from the lower position to the upper position, or vice versa, when the pivot wheel 17 is lowered from the upper position to the lower position.

FIG. 4a-b show side views of the mower deck 5 and are together with FIGS. 1 and 2 intended to describe the function of the mower deck suspension arrangement 13 as well as the function of the rear cutting height adjustment device 29. From FIGS. 1 and 2 it is apparent that the mower deck suspension arrangement 13 and the rear cutting height adjusting device 29 are provided at the top rear edge of the mower deck 5. A locking mechanism 60 is provided on the support arms 9 to cooperate with the mower deck suspension arrangement 13 so as to fasten the mower deck 5 to the support arms 9.

The suspension arrangement 13 comprises a cross-bar 51 (see also FIG. 2) having a circular cross-section and which is mounted to and along the rear top edge of the mower deck 5. The cross-bar 51 is pivotally journalled in a first and a second bearing 53 (see FIG. 1), which are attached to the mower deck 5. Two brackets 55 are attached to the cross-bar 51 in the vicinity of each support arm 9 and projects perpendicularly from it. A first end of the bracket is attached to the cross-bar 51, while an oblong chain link 57 is attached to the opposite end by means of a bolt-nut or rivet joint 59 in such a way that the chain link 57 can slide along the bolt/rivet 59.

Each locking mechanism 60 comprises a hollow sleeve 59 (see FIG. 1) which is fixedly mounted on top of the support arm 9 in such a way that a through hole of the sleeve 59 extends perpendicularly to the longitudinal direction of the support arm 9. Each locking mechanism further comprises a detachable pin 61 (see FIGS. 1-2) which can fit into the sleeve 59.

The rear edge of the mower deck 5 can thus be suspended by the support arm 9 by means of the pin 61 when it is led through the chain link 57 and through the sleeve 59 on the support arm 9. The reverse action is of course also conceivable, i.e. the rear edge of mower deck 5 can be disengaged from the locking mechanism by simply removing the pin 61 from the sleeve 59.

The cross-bar 51 is at one end provided with a bent edge to which the rear cutting height adjustment device 29, in the form of an adjustment disk 29, is attached. The adjustment disk 29 is provided with a curved slot 63 which is provided with not shown circular recesses separated along the slot 63. The circular recesses determine positions, which each correspond to a particular cutting height of the mower deck. These recesses are correlated with the circular recesses provided in the upper curved slot of the front adjustment disks 27. A rod 65 having a first end, which is attached to one shank 31a of the V-shaped beam 31 (the upper one as seen in FIG. 2), extends backwardly and is at a second end provided with a threaded bore hole. A pin 67 is introduced through the slot 63 and is by means of one of its ends in threading engagement with the bore hole. A handle 69 (see FIG. 1) is attached to the other end of the pin 67, so that the pin can be tightened and by means of friction grip about and lock the rear adjustment disk 29. Moreover, a grip 71 is provided on top of the adjustment disk 29, so that the adjustment disk can be pushed or pulled backward or forward, wherein the pin 67 will slide within the slot 63. When the adjustment disk 29 is pushed or pulled the circular cross-bar 51 is pivoted in the bearings 53.

By pivoting the cross-bar 51, the height position of the brackets 55, which are arranged on the circular cross-bar 51, will change with respect to the support arms 9. This is necessary since the distance between the support arms 9 and the mower deck 5 will change when the cutting height of the mower deck 5 is adjusted. This will be more clearly explained with reference to FIG. 5a-e.

Figure 5A:
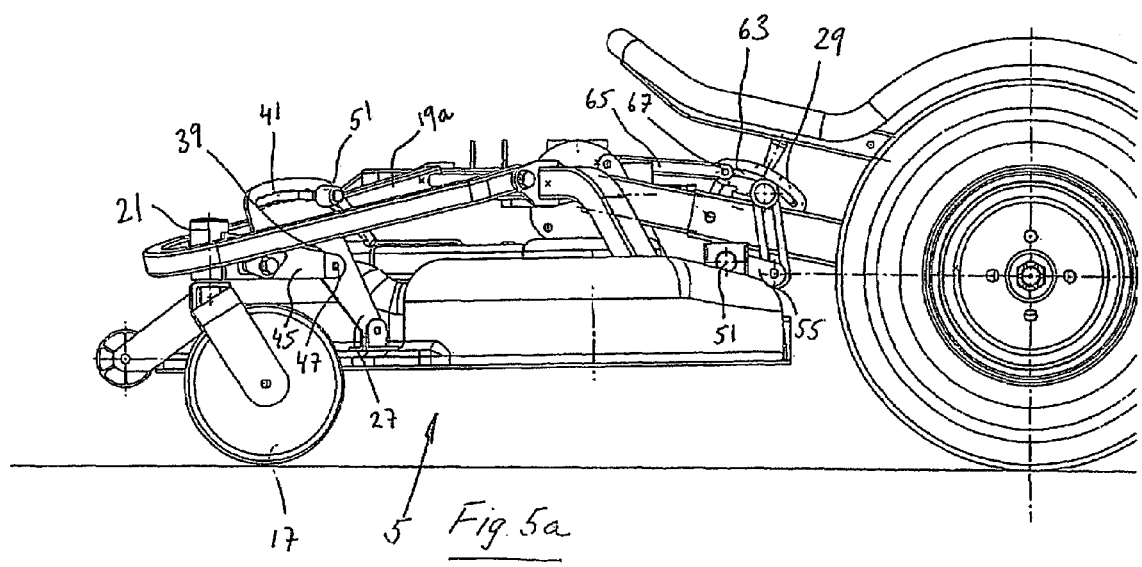

FIG. 5a-e show a sequence of how the cutting height adjustment of the mower deck 5 is performed. In FIG. 5a the mower deck 5 is supported by the pivot wheels 17 which rest against the ground. As is evident from the figure, the pivot axis 21 of the axle is perpendicular to the ground and substantially perpendicular to the plane of the cutting knifes. In this position the mower deck 5 is situated at a distance from the ground, which distance corresponds to a maximum cutting height. To put the mower deck 5 in this position, the front adjustment disks 27 have to adopt a position where the pin 51 of the leg 19a and the pin 47 of the track rod 45 are situated in the rearmost position of the upper 41 and lower 39 curved slots, respectively. In a corresponding way the rear adjustment disk 29 have to adopt a position where the pin 67 of the bar 65 is situated in the foremost position in the curved slot 63. By putting the rear adjustment disk 29 in this position, the cross-bar 51 will pivot the brackets 55 to their lowermost position with respect to the mower deck 5. This is necessary since the distance between the mower deck 5 and the support arms 9 is minimized when the cutting height of the mower deck 5 is maximized.

Figure 5B:
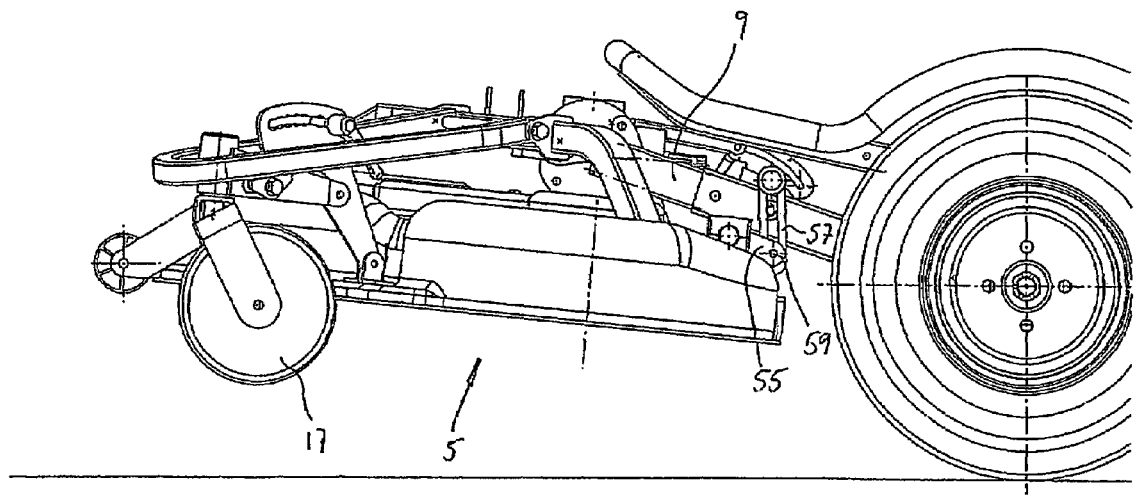

As shown in FIG. 5b, the support arms 9 have been lifted to an upper position by means of a not shown hydraulic cylinder. The hydraulic cylinder pivots the support arms 9 in a clockwise motion (as seen in FIG. 5b) with a predetermined angle. In this upper position, the front pivot wheels 17 no longer rest on the ground, so the whole weight of the mower deck 5 is supported by the support arms 9. This upper position is required during the transportation of the lawn mower 1, e.g. to and from the lawn to be cut, but this upper position is also normally required when the operator needs to adjust the cutting height of the mower deck 5.

The mower deck 5 has been designed so its centre of gravity is located in front of the horizontal pivot axis 11 of the mower deck 5. Due to this position of the centre of gravity, and since the mower deck is positioned in the upper position, with no contact with the ground (i.e. fully suspended by the support arms 9), the mower deck 5 will try to reach equilibrium about the horizontal pivot axis 11 of the mower deck 5 and therefore pivot in the anti-clockwise direction until the top rear edge of the mower deck 5 abuts against the underside of the support arms 9, which then prevent further pivotal. The abutment of the rear edge of the mower deck 5 is possible, since the pin 59 of the bracket 55 is movable within the chain-link 57 of the mower deck suspension arrangement 13. This is an automatic behaviour with no human intervention and is realized due to the weight distribution of the mower deck 5 with respect to the horizontal pivot axis 11.

The advantage with this location of the centre of gravity of the mower deck 5 is that the mower deck suspension arrangement 13, the locking mechanism 60 and the rear cutting height adjustment device 29 are not loaded by the weight of the mower deck 5. Thus, it becomes easier to push or pull the grip 71 on the rear adjustment disk 29 in the rearward or forward direction or to disengage the locking mechanism 60, i.e. to remove the pin 61 from the sleeve 59 (see FIG. 4a-b). When removing the pin 61, the mower deck 5 will not fall down against the ground as may happen with related art mower decks, so the operator does not need to hold the mower deck 5 with one hand while removing the pin.

Figure 5C:
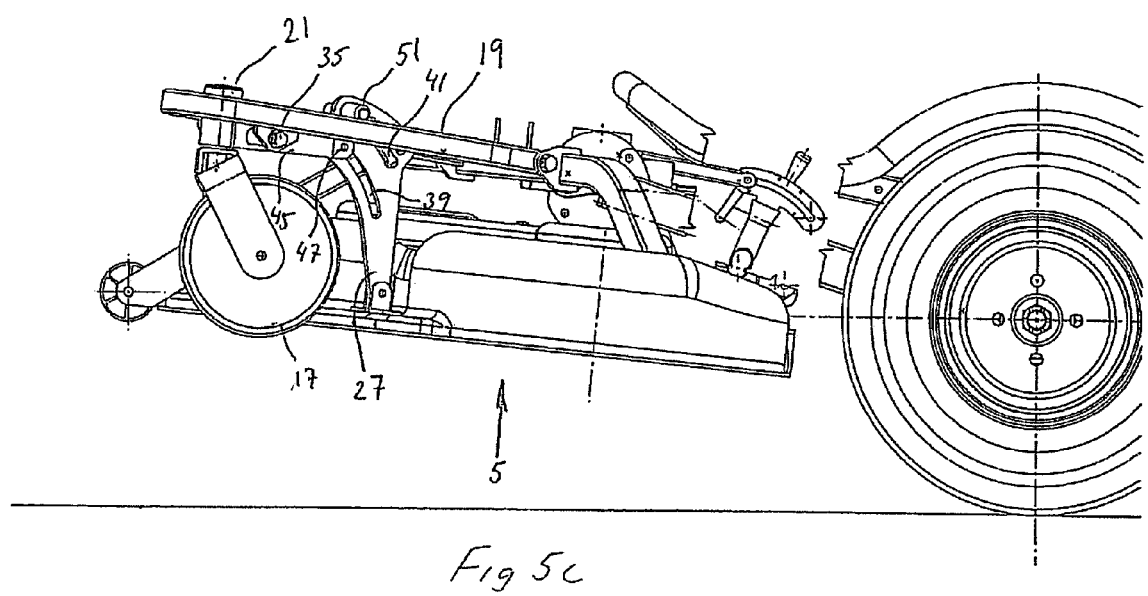

In FIG. 5c the distal end of the wheel suspension arrangement 19 together with the pivot axle 21 and the pivot wheels 17 have been lifted manually (after the handle 53 has released its grip about the adjustment disk 27), whereby the front adjustment disk 27 has been pivoted backwards, so that the pin 51 of the leg 19a and the pin 47 of the track rod 45 have adopted the foremost position in the upper 41 and lower 39 curved slots, respectively. The pivot wheel axle 21 will during this motion remain its substantially perpendicular alignment with the plane of the cutting knifes, since it performs a parallel motion between the position depicted in FIG. 5b and the position depicted in FIG. 5c. This is as mentioned above possible since the pin 47 of the track rod 45 will force the pivot axle 21, due to the shape of the lower curved slot 39, to pivot about its horizontal axis 35. This position of the pivot wheels 17 corresponds to the lowest cutting height of the mower deck 5.

Figure 5D:
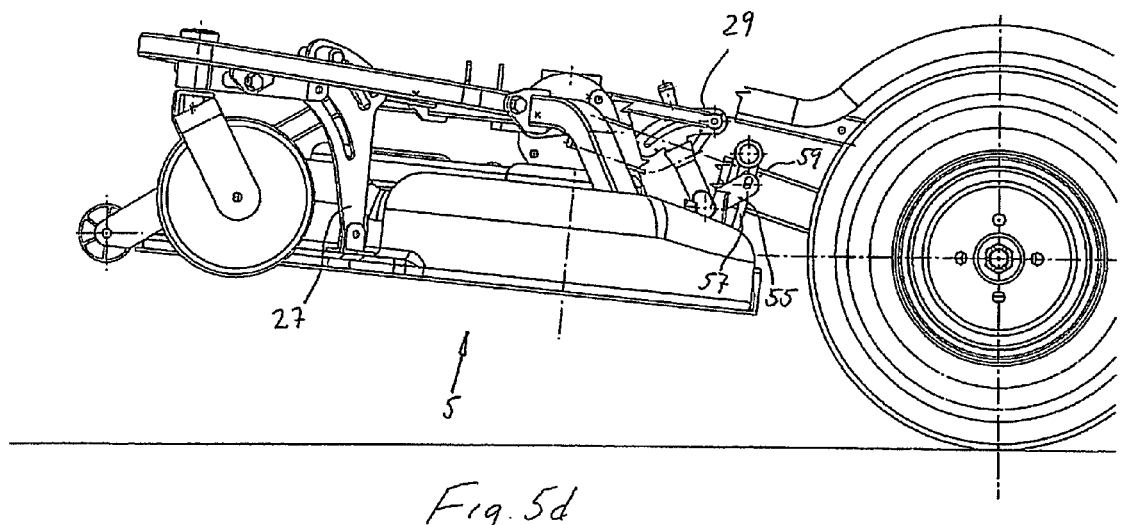

In FIG. 5d the grip of the rear adjustment disk 29 have been pulled to its foremost position for pivoting the cross-bar 51, so as to put the brackets 55 of the cross-bar in an upwardly projecting position. This repositioning of the brackets 55 is necessary so that the plane 10 of the cutting knifes becomes substantially horizontally aligned, when the mower deck at a later stage is lowered to the ground (see FIG. 5e). As a consequence, the pin 59 of the brackets 55 will move within the chain-link 57 to an upper position. However, it is not necessary to disengage the locking mechanism 60, but it can remain attached to the support arms 9 during cutting height adjustments.

In FIG. 5e the support arms 9 have been lowered to their original position so that the pivot wheels 17 rest against the ground again. Since the pivot axis 21 has remained in the substantially perpendicular alignment with the plane of the cutting knifes, it will in this position still be perpendicular to the ground. Since the mower deck 5 no longer is solely supported by the support arms 9, but is supported by the pivot wheels 17, the rear edge of the mower deck 5 will pivot in the clockwise direction when the pivot wheels 17 get in contact with the ground. Since the bracket 55 has been pivoted to its upper position (see FIG. 5d), the pin 59 can slide downwards within the chain-link 57 until it reaches the end of the chain-link, and thereby the plane of the cutting knife can be maintained in a substantially horizontal alignment.

Even though not explicitly described above, the handles 53 and 69 need to be loosened or tightened before/after the adjustment disks 27 and 29 are to be moved during cutting height adjustments.

When comparing FIG. 5a with FIG. 5e it is apparent that the distance between the mower deck 5 and the ground has been reduced by the adjustment of the mutual height relationship between the pivot wheels 17 and the mower deck 5. To accomplish such a movement with maintained parallel alignment between the ground and the mower deck 5 as well as maintained substantially perpendicular alignment between the pivot wheel axle 21 and the plane 10 of the cutting knifes it is important to keep in mind that the lower 39 and the upper 41 curved slots of the front adjustment disk 27 and the curved slot 67 of the rear adjustment disk 29 must be designed and adapted in a specific way. The skilled man will however when reading this description realise how to accomplish such a design and adaptation of the slots.

The invention claimed is:

1. A lawn mower (1), comprising:
   a front mounted mower deck (5) comprising at least one cutting knife, wherein the cutting knife is rotatably arranged in a substantially horizontal plane (10),
   a wheel suspension arrangement (19) connected to the mower deck (5) via a first pivot connection (33),
   at least one wheel (17) to be in contact with the ground so as to support the mower deck (5) during mowing, wherein the wheel (17) is connected to the wheel suspension arrangement (19) by means of an axle (21) in perpendicular alignment with the ground during mowing, and
   a cutting height adjustment device (27) connected to the mower deck (5) via a second pivot connection (37) and adapted to move the wheel suspension arrangement (19) with respect to the mower deck (5) for adjusting the mutual height relationship between the wheel (17) and the mower deck (5), so as to adjust the distance between the plane (10) of the cutting knife and the ground, the wheel (17) and the axle (21) being connected to the mower deck (5) through the suspension arrangement (19) and the cutting height adjustment device (27), characterised in that the axle (21) is pivotal about an axis (35) with respect to the wheel suspension arrangement (19) and connected to the cutting height adjustment device (27) in such a way that the axle (21) is parallelly displaced simultaneously with the movement of the wheel suspension arrangement (19) such that the perpendicular alignment of the axle (21) with the ground during mowing is automatically maintained.

2. The lawn mower according to claim 1, wherein the axis (35) is horizontal.

3. The lawn mower according to claim 2, wherein the cutting height adjustment device (27) comprises an adjustment disk (27) which is connected to the mower deck (5) and which is provided with a first curved slot (39), wherein the axle (21) comprises a track rod (45) having a first pin (47) which is slidable along the first slot (39) for pivoting the axle (21) about the axis (35), when the suspension arrangement (19) is moved with respect to the mower deck (5) so as to parallelly displace the axle (21).

4. The lawn mower according to any of claims 1-3, comprising at least two of said wheel suspension arrangements (19) and at least two of said cutting height adjustment devices (27), wherein the cutting height adjustment devices (27) are adapted to move a respective wheel suspension arrangement (19) independently of each other with respect to the mower deck (5).

5. The lawn mower according to claim 1, comprising at least one support arm (9) connecting the mower deck (5) with a chassis (7) of the lawn mower, wherein the support arm (9) can lift the mower deck (5) to a position in which the mower deck (5) is pivotally suspended by the support arm (9) along a horizontal pivot axis (11), wherein the mower deck (5) has its centre of gravity located in front of the pivot axis (11), with respect to a forward direction of the lawn mower (1), and wherein the mower deck comprises a mower deck suspension arrangement (13) for suspending a rear edge of the mower deck (5) to the support arm (9), at a point which is located behind the pivot axis (11) with respect to the forward direction of the lawn mower (1).

6. A lawn mower (1), comprising:
   a front mounted mower deck (5) comprising at least one cutting knife, wherein the cutting knife is rotatably arranged in a substantially horizontal plane (10),
   a wheel suspension arrangement (19) connected to the mower deck (5) at an end (78) via a first pivot connection (33),
   at least one wheel (17) to be in contact with the ground so as to support the mower deck (5) during mowing, wherein the wheel (17) is connected to the wheel suspension arrangement (19) by means of an axle (21) to be in perpendicular alignment with the ground during mowing, and
   a cutting height adjustment device (27) connected to the mower deck (5) via a second pivot connection (37) and adapted to move the wheel suspension arrangement (19) with respect to the mower deck (5) for adjusting the mutual height relationship between the wheel (17) and the mower deck (5), so as to adjust the distance between the plane (10) of the cutting knife and the ground, the wheel (17) and the axle (21) being connected to the mower deck (5) through the suspension arrangement (19) and the cutting height adjustment device (27), characterized in that the axle (21) is pivotal about an axis (35) with respect to the wheel suspension arrangement (19) and connected to the cutting height adjustment device (27) in such a way that the axle (21) is parallelly displaced when the wheel suspension arrangement (19) is moved,
   wherein the axis (35) is horizontal, the cutting height adjustment device (27) comprises an adjustment disk (27) which is connected to the mower deck (5) and which is provided with a first curved slot (39), wherein the axle (21) comprises a track rod (45) having a first pin (47) which is slidable along the first slot (39) for pivoting the axle (21) about the axis (35), when the suspension arrangement (19) is moved with respect to the mower deck (5) so as to parallelly displace the axle (21), and wherein the adjustment disk (27) is provided with a second curved slot (41), and the wheel suspension arrangement (19) comprises a second pin (51) which is slidable along the second slot (41) when the wheel suspension arrangement (19) is moved with respect to the mower deck (5), and which is second pin (51) is adapted to lock the adjustment disk (27) with respect to the wheel suspension arrangement (19) at positions along the second slot (41).

7. The lawn mower according to claim 6, comprising at least two of said wheel suspension arrangements (19) and at least two of said cutting height adjustment devices (27), wherein the cutting height adjustment devices (27) are adapted to move a respective wheel suspension arrangement (19) independently of each other with respect to the mower deck (5).

* * * * *